(12) United States Patent
Crowley et al.

(10) Patent No.: US 12,153,817 B2
(45) Date of Patent: Nov. 26, 2024

(54) HOST DEVICE CONFIGURED FOR EFFICIENT DELIVERY OF OFFLOAD API COMMANDS TO MULTIPLE STORAGE SYSTEMS

(71) Applicant: Dell Products L.P., Round Rock, TX (US)

(72) Inventors: Owen Crowley, Carrigaline (IE); Peniel Charles, Bangalore (IN); Amit Pundalik Anchi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 37 days.

(21) Appl. No.: 18/099,660

(22) Filed: Jan. 20, 2023

(65) Prior Publication Data

US 2024/0248627 A1    Jul. 25, 2024

(51) Int. Cl.
    *G06F 3/06* (2006.01)
(52) U.S. Cl.
    CPC ............ *G06F 3/0647* (2013.01); *G06F 3/061* (2013.01); *G06F 3/0659* (2013.01); *G06F 3/0679* (2013.01)
(58) Field of Classification Search
    None
    See application file for complete search history.

(56) References Cited

U.S. PATENT DOCUMENTS

| | | | |
|---|---|---|---|
| 6,567,397 | B1 | 5/2003 | Campana, Jr. et al. |
| 6,687,746 | B1 | 2/2004 | Shuster et al. |
| 6,697,875 | B1 | 2/2004 | Wilson |
| 7,275,103 | B1 | 9/2007 | Thrasher et al. |
| 7,454,437 | B1 | 11/2008 | Lavallee et al. |
| 7,617,292 | B2 | 11/2009 | Moore et al. |

(Continued)

FOREIGN PATENT DOCUMENTS

| | | |
|---|---|---|
| CN | 103677927 B | 2/2017 |
| EP | 1117028 A2 | 7/2001 |
| EP | 2667569 A1 | 11/2013 |

OTHER PUBLICATIONS

International Search Report and Written Opinion of PCT/US2019/052549 dated Dec. 4, 2019, 13 pages.

(Continued)

*Primary Examiner* — Yaima Rigol
*Assistant Examiner* — Elias Young Kim
(74) *Attorney, Agent, or Firm* — Ryan, Mason & Lewis, LLP

(57) ABSTRACT

An apparatus includes at least one processing device configured to identify one or more logical storage devices each accessible in at least first and second storage systems, to detect one or more input-output (IO) operations associated with an offload application programming interface (API) of at least one of the first and second storage systems, to clone each such detected IO operation, and to send resulting respective first and second instances of each cloned IO operation to respective ones of the first and second storage systems. The first and second instances of each cloned IO operation are tagged prior to being sent to respective ones of the first and second storage systems so as to allow each of the first and second storage systems to separately determine that the other one of the first and second storage systems has been sent a corresponding instance of the cloned IO operation.

20 Claims, 3 Drawing Sheets

(56) References Cited

U.S. PATENT DOCUMENTS

| | | |
|---|---|---|
| 7,668,981 B1 | 2/2010 | Nagineni et al. |
| 7,770,053 B1 | 8/2010 | Bappe et al. |
| 7,809,898 B1* | 10/2010 | Kiselev ............... G06F 11/2082 |
| | | 711/111 |
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 10,936,220 B2 | 3/2021 | Mallick et al. |
| 10,949,104 B2 | 3/2021 | Marappan et al. |
| 10,996,879 B2 | 5/2021 | Gokam |
| 11,016,699 B2 | 5/2021 | Anchi et al. |
| 11,016,783 B2 | 5/2021 | Rao et al. |
| 11,093,144 B1 | 8/2021 | Anchi et al. |
| 11,093,155 B2 | 8/2021 | Anchi et al. |
| 11,106,381 B2 | 8/2021 | Rao et al. |
| 11,126,363 B2 | 9/2021 | Tidke et al. |
| 11,157,203 B2 | 10/2021 | Gokam et al. |
| 11,366,590 B2 | 6/2022 | Mallick et al. |
| 11,366,771 B2 | 6/2022 | Smith et al. |
| 11,385,824 B2 | 7/2022 | Anchi et al. |
| 11,449,257 B2 | 9/2022 | Rao et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0028163 A1 | 1/2008 | Woods et al. |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2015/0301970 A1 | 10/2015 | Armstead et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0163373 A1* | 5/2019 | Compton ................ G06F 3/065 |
| 2019/0235790 A1* | 8/2019 | Koo ........................ G06F 21/78 |
| 2019/0324950 A1* | 10/2019 | Shetty ................ G06F 11/1464 |
| 2019/0334987 A1 | 10/2019 | Mallick et al. |
| 2020/0021653 A1 | 1/2020 | Rao et al. |
| 2020/0045109 A1 | 2/2020 | Hegde et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0301948 A1* | 9/2020 | Narasingarayanapeta ................... |
| | | G06F 3/065 |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1* | 1/2021 | Anchi ...................... G06F 3/067 |
| 2021/0026551 A1 | 1/2021 | Tidke et al. |
| 2021/0026650 A1 | 1/2021 | Rao et al. |
| 2021/0109658 A1 | 4/2021 | Mallick et al. |
| 2021/0157502 A1 | 5/2021 | Rao et al. |
| 2021/0181965 A1 | 6/2021 | Anchi et al. |
| 2021/0255784 A1 | 8/2021 | Anchi et al. |
| 2021/0263665 A1 | 8/2021 | Rao et al. |
| 2021/0397369 A1* | 12/2021 | David ..................... G06F 3/061 |
| 2022/0171559 A1 | 6/2022 | Anchi et al. |
| 2022/0179804 A1 | 6/2022 | Anchi et al. |

OTHER PUBLICATIONS

International Search Report and Written Opinion of PCT/US2019/053204 dated Dec. 16, 2019, 40 pages.

International Search Report and Written Opinion of PCT/US2019/053473 dated Dec. 19, 2019, 16 pages.

International Search Report and Written Opinion of PCT/US2019/067144 dated May 4, 2020, 26 pages.

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS vol. Management," 2009, 8 pages.

Dell EMC, "Dell EMC Unity: Virtualization Integration," Technical White Paper, Oct. 2019, 39 pages.

(56) References Cited

OTHER PUBLICATIONS

Dell EMC, "Dell EMC PowerMax: ISCSI Implementation for Dell EMC Storage Arrays Running PowerMaxOS," Technical White Paper, Sep. 2019, 35 pages.
NVM Express, "NVM Express Base Specification, Revision 2.0a," NVM Express, Jul. 23, 2021, 454 pages.
NVM Express, "NVM Express Base Specification, Revision 2.0b," NVM Express, Jan. 6, 2022, 455 pages.
Dell Technologies, "Dell EMC Metro Node 7.0.1," Product Guide, Jul. 2021, 33 pages.
Dell Technologies, "Asymmetric Logical Unit Access," https://infohub.delltechnologies.com/l/dell-powervault-me5-series-vmware-vsphere-best-practices/asymmetric-logical-unit-access, Accessed Jan. 10, 2023, 1 page.
Dell Technologies, "NVMe Common Storage Elements," https://infohub.delltechnologies.com/l/nvme-nvme-tcp-and-dell-smartfabric-storage-software-overview-ip-san-solution-primer-1/nvme-common-storage-elements, Accessed Jan. 10, 2023, 6 pages.
VMware, "VMware vSphere Storage APIs—Array Integration (VAAI)," Technical Marketing Documentation, V 1.1, Dec. 2012, 19 pages.
U.S. Appl. No. 18/096,076 filed in the name of Rimpesh Patel et al., filed Jan. 12, 2023, and entitled "Host Device Configured for Automatic Detection of Storage System Local-Remote Designations."

\* cited by examiner

HOST DEVICE CONFIGURED FOR EFFICIENT DELIVERY OF OFFLOAD API COMMANDS TO MULTIPLE STORAGE SYSTEMS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols.

SUMMARY

Illustrative embodiments configure a host device for efficient delivery of commands associated with offload application programming interfaces (APIs) to logical storage volumes in a metro/stretched configuration involving first and second storage arrays. Such a metro/stretched configuration is an example of what is more generally referred to herein as an "active-active" configuration. Other configurations involving at least first and second storage arrays or other types of storage systems may additionally or alternatively be used.

At least portions of the disclosed functionality can be managed by at least one host driver, such as a multi-path input-output (MPIO) driver, in conjunction with processing of IO operations. The MPIO driver is illustratively part of a multi-path layer that is configured to process IO operations of at least one host device that communicates with one or more storage arrays or other types of storage systems. Other types of host drivers can be used in place of or in addition to one or more MPIO drivers.

Some embodiments more particularly configure one or more host devices to optimize storage array utilization during execution of offload API commands for metro/stretched logical units (LUNs) or other logical storage volumes. Such commands illustratively include, for example, VMware vSphere Storage APIs Array Integration (VAAI) commands, although other types of offload API commands can be used, such as alternative hardware acceleration API commands and/or hardware offload API commands.

These and other embodiments can provide significantly improved performance, for example, in situations in which the host device would otherwise send the offload API commands to the first storage system such that the first storage system has to consume excessive resources in replicating the commands to the second storage system.

In one embodiment, an apparatus comprises at least one processing device comprising a processor and a memory coupled to the processor. The at least one processing device is illustratively configured to identify one or more logical storage devices each accessible in at least first and second storage systems, to detect one or more IO operations associated with an offload API of at least one of the first and second storage systems, to clone each such detected IO operation, and to send resulting respective first and second instances of each cloned IO operation to respective ones of the first and second storage systems. The first and second instances of each cloned IO operation are tagged prior to being sent to respective ones of the first and second storage systems so as to allow each of the first and second storage systems to separately determine that the other one of the first and second storage systems has been sent a corresponding instance of the cloned IO operation.

The at least one processing device illustratively comprises at least a portion of the host device, with the host device being coupled to the first and second storage systems via at least one network.

The at least one processing device in some embodiments further comprises a multi-path layer that includes at least one MPIO driver configured to control delivery of IO operations from the host device to the first and second storage systems over selected paths through a network over which the host device communicates with the first and second storage systems.

A given one of the logical storage devices is illustratively accessible to the multi-path layer via one or more first sets of paths to the first storage system and one or more second sets of paths to the second storage system. The first instance of the cloned IO operation is sent to the first storage system over a selected path of the one or more first sets of paths and the second instance of the cloned IO operation is sent to the second storage system over a selected path of the one or more second sets of paths.

In some embodiments, the tagging of the first and second instances of each cloned IO operation is illustratively configured to cause each of the respective first and second storage systems to prevent replication of the cloned IO operation to the other one of the first and second storage systems.

Additionally or alternatively, the at least one processing device in some embodiments is further configured to detect a failure in execution of one of the first and second instances of the cloned IO operation and responsive to the detected failure to send another instance of the cloned IO operation to a particular one of the first and second storage systems not associated with the detected failure. The other instance of the cloned IO operation is illustratively sent without being tagged so that the particular one of the first and second storage systems that receives the other instance will replicate the cloned IO operation to the other one of the first and second storage systems.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
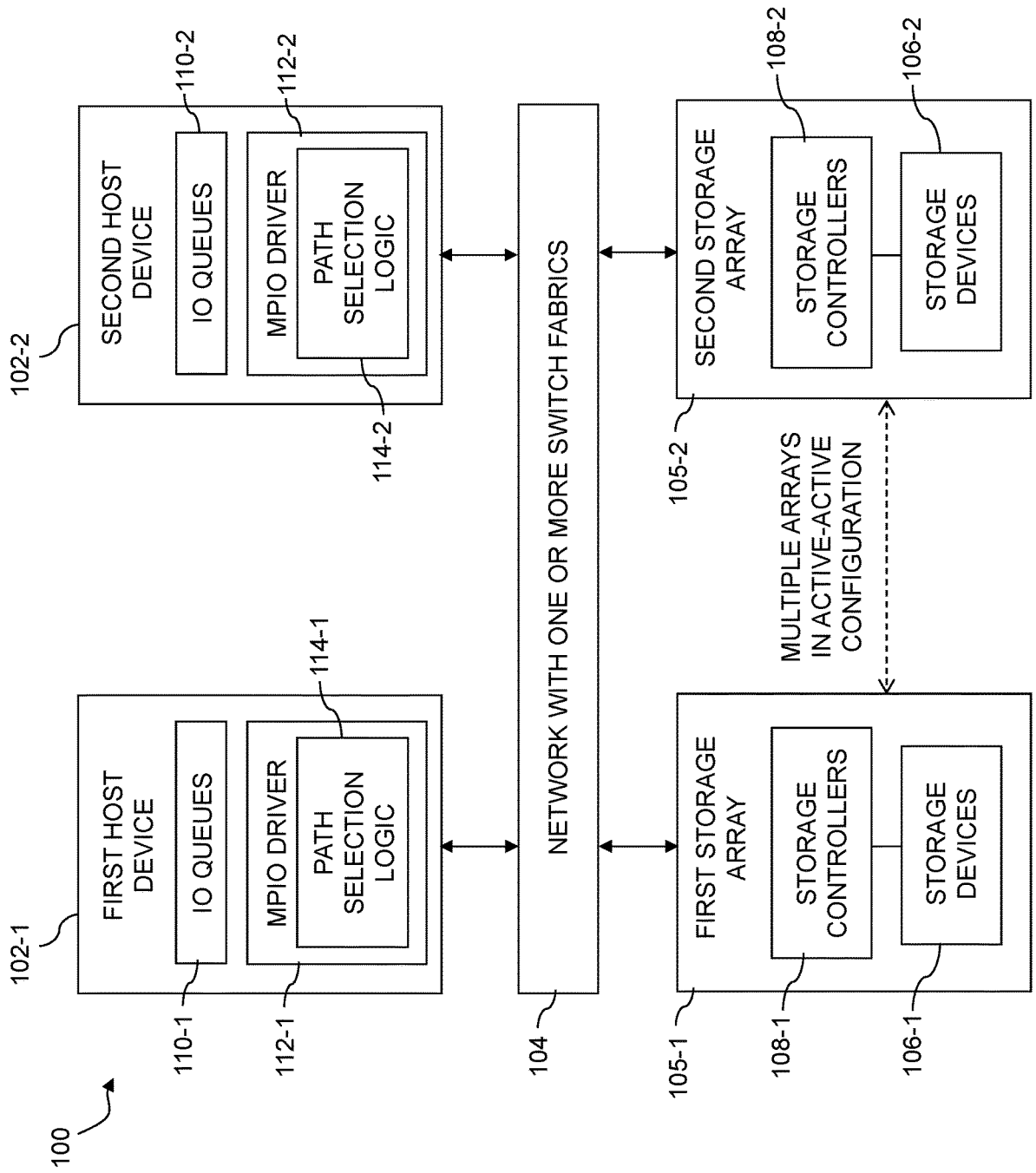
FIG. 1 is a block diagram of an information processing system configured with functionality for efficient delivery of offload API commands to multiple storage arrays in an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more switch fabrics. The host devices 102 communicate over the network 104 via the one or more switch fabrics with at least first and second storage arrays 105-1 and 105-2, also collectively referred to herein as first and second storage arrays 105, or simply storage arrays 105. For example, in some embodiments the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Also, other types of networks can be used in other embodiments, and references to SANs, switch fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device and/or a single storage array.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The first and second storage arrays 105-1 and 105-2 comprise respective sets of storage devices 106-1 and 106-2, collectively referred to herein as storage devices 106, coupled to respective sets of storage controllers 108-1 and 108-2, collectively referred to herein as storage controllers 108. The storage controllers 108 may comprise, for example, storage processors, service processors, and/or other arrangements of processing circuitry configured to process IO operations received by the corresponding storage array. The term "storage controller" as used herein is therefore intended to be broadly construed, so as to encompass these and other arrangements, such as processing devices that are more particularly referred to herein as storage array processors. Each of the storage controllers 108 illustratively has one or more ports associated therewith for supporting communications between the storage arrays 105 and the host devices 102 over the network 104. In some embodiments, a given one of the storage controllers 108 illustratively comprises IO processing logic and tag processing logic of a type described in more detail elsewhere herein.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices. In some embodiments, at least one of the storage arrays 105 illustratively comprises one or more PowerMax™ or PowerStore™ storage arrays, commercially available from Dell Technologies.

As another example, one or both of the storage arrays 105 may comprise respective clustered storage systems, each including a plurality of storage nodes interconnected by one or more networks. An example of a clustered storage system of this type is a scale-out all-flash content addressable storage array distributed over multiple storage nodes.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on one of the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 illustratively implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104. The above-noted LUNs are examples of what are more generally referred to herein as logical storage volumes, or still more generally, logical storage devices.

The read and write commands in some embodiments more particularly comprise SCSI commands, although other types of commands may be used in other embodiments, including commands that are part of a standard command set, such as NVMe commands, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by one of the host devices 102 to one of the storage arrays 105 is considered an "outstanding" command until such time as its execution is completed in the viewpoint of the sending host device, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes.

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

As a more particular example, the host devices 102 in some embodiments illustratively comprise an ESXi environment or other type of host environment that supports non-disruptive movement of applications between ESXi servers or other types of servers, possibly using vMotion or other similar techniques to move VMs, in which those application execute, from one server to another server.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with the NVMe access protocol, as described in the NVMe Base Specification, Revision 2.0b, Jan. 6, 2022, which is incorporated by reference herein. Other storage access protocols of this type that may be utilized in illustrative embodiments disclosed herein include NVMe over Fabric, also referred to as NVMeoF, and NVMe over Transmission Control Protocol (TCP), also referred to as NVMe/TCP.

In some embodiments, the storage arrays 105 are arranged in a configuration in which one of the storage arrays 105 is designated as a local storage array relative to at least one of the host devices 102, and the other one of the storage arrays 105 is designated as a remote storage array relative to at least one of the host devices 102. For example, the storage arrays may be arranged in a metro and/or stretched ("metro/stretched") configuration or other active-active configuration, or another type of configuration relative to one another that involves local-remote designations. However, it should be noted that use of storage-side local-remote designations of the storage arrays 105 is not required. Accordingly, in some embodiments, neither of the storage arrays 105 is explicitly designated as local or remote.

Although the first and second storage arrays 105-1 and 105-2 in the present embodiment are shown as being arranged in an active-active configuration, use of such a configuration is not required. In an example of an active-active configuration that may be used, data stored in one of the storage arrays 105 is replicated to the other one of the storage arrays 105 utilizing a replication process. Such data replication across the multiple storage arrays 105 can be used to facilitate failure recovery in the system 100. One of the storage arrays 105 may therefore operate as a production storage array relative to the other storage array which operates as a backup or recovery storage array. Examples of active-active configurations include "metro" or "stretched" high availability storage array configurations. The term "active-active configuration" as used herein is therefore intended to be broadly construed.

The first and second storage arrays 105-1 and 105-2 in some embodiments may be configured to participate in a replication process, such as a synchronous replication process. In accordance with one type of synchronous replication process, a given one of the host devices 102 writes data to one of the storage arrays 105, and that host device receives an acknowledgement of success only after the data has been successfully written to both of the storage arrays 105. For example, if the host device directs a write to the first storage array 105-1, that storage array mirrors the write to the second storage array 105-2 and receives an acknowledgement of success back from the second storage array 105-2. The first storage array 105-1 then responds back to the host device with an acknowledgement of success.

This type of synchronous replication process is therefore configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for concurrent operation of such modes and separate operation of the individual modes. It is also possible in some embodiments that a given replication process implemented using storage arrays 105 may comprise only synchronous replication or only asynchronous replication, instead of multiple distinct replication modes.

A given logical storage device implemented on one or both of the storage arrays 105 in the system 100 illustratively comprises a set of one or more LUNs or other logical storage volumes of one or both of the storage arrays 105. Each such LUN or other logical storage volume is assumed to comprise at least a portion of a physical storage space of one or more of the storage devices 106 of the corresponding storage arrays 105.

The host devices 102 comprise respective sets of IO queues 110-1 and 110-2, and respective MPIO drivers 112-1 and 112-2. The MPIO drivers 112 collectively comprise a multi-path layer of the host devices 102. As will be described in more detail below, the multi-path layer illustratively provides functionality for efficient delivery of offload API commands to the first and second storage arrays 105 using respective instances of path selection logic 114-1 and 114-2 implemented within the MPIO drivers 112. A given such offload API command illustratively comprises one or more IO operations, although other relationships between IO operations and offload APIs are possible. Terms such as "IO operation" and "offload API command" as used herein are therefore intended to be broadly construed. In some embodiments, the instances of path selection logic 114 include or are otherwise associated with offload API cloning logic configured for cloning and tagging of offload API commands or other IO operations associated with an offload API as described elsewhere herein.

The MPIO drivers 112 may comprise, for example, otherwise conventional MPIO drivers, such as PowerPath® drivers from Dell Technologies, suitably modified in the manner disclosed herein to support at least portions of the disclosed functionality for efficient delivery of offload API commands to multiple storage arrays. Other types of MPIO drivers from other driver vendors may be suitably modified to incorporate functionality for efficient delivery of offload API commands to multiple storage arrays as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals. In some embodiments herein, such path selection may be aligned to storage-side local-remote designations of respective ones of the storage arrays 105, although such alignment or other utilization of storage-side local-remote designations is not required.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical storage device of one of the storage arrays 105. The corresponding logical storage device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

As is apparent from the foregoing, MPIO driver 112-1 of host device 102-1 is configured to control delivery of IO operations from the host device 102-1 to the first and second storage arrays 105 over selected paths through the network 104.

The MPIO driver 112-1 is also illustratively configured to implement, utilizing its path selection logic 114-1, at least portions of the disclosed functionality for efficient delivery of offload API commands in the host device 102-1. This functionality in illustrative embodiments herein is assumed to include cloning and tagging of each of a plurality of offload API commands for one or more logical storage devices accessible in both of the storage arrays 105, as will be described in more detail below.

Other host device components, such as logic components implemented in one or more host device processors external to the MPIO driver 112-1, can additionally or alternatively implement aspects of such functionality of the host device 102-1. The disclosed embodiments are therefore not limited to embodiments in which functionality for efficient delivery of offload API commands is controlled at least in part by an MPIO driver or multi-path layer.

Illustrative embodiments disclosed herein advantageously address and overcome problems that might otherwise arise when processing offload API commands for delivery to the storage arrays 105 under the control of a given one of the host devices 102.

For example, some embodiments disclosed herein can provide significantly improved performance in situations in which the given host device would otherwise send offload API commands to a single one of the storage arrays 105 such that the receiving storage array has to consume excessive storage array resources in replicating the offload API commands to the other storage array.

In accordance with the functionality for efficient delivery of offload API commands as disclosed herein, a given one of the host devices 102, illustratively the host device 102-1, is configured to identify one or more logical storage devices each accessible in at least first and second storage arrays 105, to detect one or more IO operations associated with an offload API of at least one of the first and second storage arrays 105, to clone each such detected IO operation, and to send resulting respective first and second instances of each cloned IO operation to respective ones of the first and second storage arrays 105. The first and second instances of each cloned IO operation are tagged by the given host device prior to being sent to respective ones of the first and second storage arrays 105 so as to allow each of the first and second storage arrays 105 to separately determine that the other one of the first and second storage arrays 105 has been sent a corresponding instance of the cloned IO operation.

This illustrative functionality of the host device 102-1 in some embodiments is performed at least in part by the multi-path layer comprising MPIO driver 112-1 and associated path selection logic 112-1 of host device 102-1. The host device 102-1 is an example of what is more generally referred to herein as "at least one processing device" that includes a processor coupled to a memory. Other types and arrangements of one or more processing devices may be utilized in other embodiments to implement the disclosed functionality for efficient delivery of offload API commands.

The one or more IO operations associated with the offload API of at least one of the first and second storage arrays 105 in some embodiments more particularly comprise or are otherwise associated with at least one command of the offload API. For example, the one or more IO operations associated with the offload API in some embodiments comprise at least one of a hardware acceleration API command and a hardware offload API command. As a more particular example, the offload API commands in some embodiments illustratively include, for example, VMware vSphere Storage APIs Array Integration (VAAI) commands, although other types of offload API commands can be used, such as alternative hardware acceleration API commands and/or hardware offload API commands.

In some embodiments, the tagging of the first and second instances of each cloned IO operation is illustratively configured to cause each of the respective first and second storage arrays 105 to prevent replication of the cloned IO operation to the other one of the first and second storage arrays 105. Such an arrangement can advantageously optimize storage array utilization during execution of offload API commands for metro/stretched LUNs or other types of logical storage volumes.

The MPIO driver 112-1 of the host device 102-1 is illustratively configured to perform the identifying of the one or more logical storage devices, the detecting of the one or more IO operations, the cloning of the detected IO operations and the sending of the resulting respective first and second instances to respective ones of the first and second storage arrays 105.

In some embodiments, a given one of the one or more logical storage devices is accessible to the MPIO driver 112-1 of the host device 102-1 via one or more first sets of paths to the first storage array 105-1 and one or more second sets of paths to the second storage array 105-2. The first instance of the cloned IO operation is illustratively sent to the first storage array 105-1 over a selected path of the one or more first sets of paths and the second instance of the cloned IO operation is illustratively sent to the second storage array 105-2 over a selected path of the one or more second sets of paths.

The MPIO driver 112-1 in some embodiments is additionally or alternatively configured to verify that each of the first and second storage arrays 105 is able to handle offload API commands, prior to performing at least a portion of the identifying of the one or more logical storage devices, the detecting of the one or more IO operations, the cloning of the detected IO operations and the sending of the resulting respective first and second instances to respective ones of the first and second storage arrays 105.

In some embodiments, the one or more IO operations associated with the offload API comprise one or more IO operations associated with at least one offload API command wherein the offload API command comprises at least one of an XCOPY command, a WRITE SAME command and an UNMAP command. As indicated above, other types of offload API commands can be used in other embodiments.

The first and second instances of the cloned IO operation are illustratively executed to completion in the respective first and second storage arrays 105 and the cloned IO operation is considered complete in a host device only after both the first and second storage arrays 105 have indicated successful completion of the respective first and second instances of the cloned IO operation to the host device.

In some embodiments, the MPIO driver 112-1 is further configured to detect a failure in execution of one of the first and second instances of the cloned IO operation and responsive to the detected failure to send another instance of the cloned IO operation to a particular one of the first and second storage arrays 105 not associated with the detected failure. The other instance of the cloned IO operation is sent without being tagged so that the particular one of the first and second storage arrays 105 that receives the other instance will replicate the cloned IO operation to the other one of the first and second storage arrays 105.

As mentioned previously, in some embodiments, one of the first and second storage arrays 105 may be designated as local and the other of the first and second storage arrays 105 may be designated as remote, although other situations are possible in other embodiments, such as neither of the storage arrays currently being designated as local or remote. It should be noted that such storage-side designations may change over time, possibly responsive to control input provided by a storage administrator or other user.

Information characterizing local-remote designations of the respective first and second storage arrays 105 can comprise, for example, for each storage array, a corresponding single-bit indicator, with a first binary value of the single-bit indicator specifying that the storage array is designated as local, and a second binary value of the single-bit indicator specifying that the storage array is designated as remote. Multi-bit indicators and other types and arrangements of additional or alternative information can be used.

The storage-side local-remote designations may be temporary designations, and accordingly can vary over time, such that a storage array designated as local in a current time period may be designated as remote in a previous or subsequent time period, and vice versa. Terms such as "designated" and "designations" as used herein are therefore intended to be broadly construed, so as to encompass these and numerous other arrangements. The designation may be made by a storage administrator or other user, or in an at least partially automated manner based at least in part on one or more specified criteria, such as physical location of a storage array relative to one or more host devices.

The host device 102-1 in some embodiments is further configured to adjust path selection in the path selection logic 114-1 of the MPIO driver 112-1 based at least in part on the local-remote designations of the respective first and second storage arrays 105. Such an adjustment illustratively comprises adjusting path weightings or other characteristics of the path selection logic 114-1 to favor one or more of the paths to the storage array designated as local over one or more of the paths to the storage array designated as remote.

In other embodiments, the MPIO driver 112-1 is configured to issue one or more commands to at least one of the first and second storage arrays 105 in order to obtain in response thereto information characterizing the local-remote designations of the respective first and second storage arrays 105. For example, a given such command can comprise at least one of a log sense command, a mode sense command, a vendor unique command or another type of command, illustratively in accordance with a particular storage access protocol, such as a SCSI access protocol or an NVMe access protocol.

The information characterizing the storage-side local-remote designations of the storage arrays 105 can be conveyed to the host device 102-1 in any of a wide variety of different types of responses, messages, notifications or other communications. For example, in some embodiments, such information can be conveyed in responses, messages, notifications or other types and arrangements of information that may be sent from a storage array to a host device, possibly in response to a request previously received from the host device, or that may be otherwise obtained by the host device from the storage array.

In some embodiments, the information characterizing the local-remote designations is obtained directly by the host device from the storage array, using an in-band arrangement based on the above-noted commands of a storage access protocol such as SCSI or NVMe, while in other embodiments such information may be obtained indirectly by the host device from the storage array using an out-of-band arrangement, possibly involving at least one intermediary device such as an MPIO management station or another type of external server. These and numerous other in-band or out-of-band communication arrangements can be used to allow a host device to obtain information characterizing storage-side local-remote designations from one or more storage arrays in illustrative embodiments.

The information characterizing local-remote designations is illustratively obtained from one or more storage-side data structures maintained by at least one of the first and second storage arrays 105, and is stored under the control of the MPIO driver 112-1 in one or more host-side data structures of the host device 102-1.

Additional illustrative embodiments of the above-described techniques for efficient delivery of offload API commands will now be presented. These embodiments are described in the context of VAAI commands, but can be adapted in a straightforward manner to other types of offload API commands. It is assumed that these embodiments are implemented in system 100 utilizing host devices 102 and storage arrays 105.

As indicated above, illustrative embodiments provide functionality for efficient delivery of offload API commands in a metro/stretched configuration or other active-active configuration for accessing one or more LUNs or other logical storage devices from one or more host devices, although the functionality can be readily adapted for use in other configurations involving multiple storage arrays or other types of storage systems. Examples of offload API commands include VAAI commands, as well as other types of hardware acceleration API commands and/or hardware offload API commands.

The offload APIs in some embodiments define a set of "storage primitives" that enable ESXi hosts or other types of host devices to offload certain storage operations to a storage array, which reduces resource overhead on the ESXi hosts and can significantly improve performance for storage-intensive operations such as storage cloning, zeroing, and so on. Examples of storage operations that can be offloaded from a host device to a storage array via VAAI commands include XCOPY, WRITE SAME, UNMAP, etc.

However, these VAAI commands can lead to adverse performance impacts on the storage arrays in the case of metro/stretched volumes. For example, for both XCOPY and UNMAP, an ESXi host typically has to send the corresponding VAAI commands in bulk, e.g. UNMAP this LBA range, copy this 240 MB extent, etc. In a metro/stretched configuration, a given such command generally cannot be forwarded as is from the local array to the remote array. This means that each UNMAP or XCOPY command, and similarly for WRITE SAME commands, must be broken down to the "track" level for forwarding to the remote array. Therefore, a single VAAI command coming into the local array turns into thousands of IOs to the remote array, which in turn, can lead to overutilization of the communication links between the two arrays. Also, when Symmetrix Remote Data Facility (SRDF) directors are heavily utilized in a given metro/stretched configuration, a burst of IOs may cause Delta Set Extension (DSE) spillover and potentially lead to a connectivity drop in the SRDF group.

Illustrative embodiments address these and other issues by configuring multi-pathing software on a host device to clone and send VAAI commands or other types of offload API commands to both the local and remote arrays at substantially the same time, thereby avoiding the above-described IO spikes caused by replication between the two arrays.

In some embodiments, the multi-pathing software intercepts a given VAAI command, clones the command, and dispatches it to both arrays which are part of the metro/stretched configuration, thereby avoiding excessive traffic flows between the two arrays.

An example algorithm in some embodiments illustratively includes the following steps, although additional or alternative steps can be used in other embodiments:

1. An MPIO driver on a given host device verifies that both storage arrays in a metro/stretched configuration or other active-active configuration are capable of processing VAAI commands.

2. During storage operations that trigger VAAI commands, the MPIO driver intercepts a given such VAAI command, and clones the command. The IO blocks associated with the cloned commands are then tagged with a clone tag so that the receiving array is aware that the corresponding IO command has already been sent to the peer array and therefore no IO operations need to be replicated to the peer array. The clone tag can comprise, for example, a single bit indicating whether or not the corresponding IO command is a cloned command, although other types of indicators, including multi-bit indicators, can be used. Terms such as "tag" and "tagging" as used herein are therefore intended to be broadly construed.

3. The MPIO driver selects appropriate paths to the two different arrays and dispatches the VAAI command IOs to the respective arrays over the selected paths.

4. The storage arrays on receiving VAAI commands detect the above-noted tags and each array ensures that the corresponding IOs are not replicated to the other array. Accordingly, in illustrative embodiments, the VAAI command is executed to completion on the local array side, and at substantially the same time, the VAAI command is similarly executed to completion on the remote array side.

5. The VAAI command is marked as complete once both arrays complete the corresponding offloaded task.

It should be noted that the above algorithm is performed only for metro/stretched logical storage volumes or other active-active logical storage volumes. Also, in order to implement the algorithm, both arrays should be VAAI capable.

As indicated above, the VAAI commands are marked as complete only once success is returned from both storage arrays associated with the metro/stretched volumes.

If the VAAI command repeatedly fails on any one of the storage arrays, the command will be retried again on the array which successfully processed the VAAI command, but this time without the clone tag referenced in step 2 of the algorithm.

The above-described arrangements advantageously avoid the drawbacks of conventional practice relating to use of VAAI commands or other types of offload API commands for metro/stretched configurations and other active-active configurations. Such arrangements therefore avoid the need for disabling certain types of VAAI commands, such as XCOPY commands, or modify the XCOPY size, both of which can introduce adverse performance impacts in the system.

Portions of the above-described algorithm and other related techniques and functionality disclosed herein are illustratively implemented at least in part by a given MPIO driver on a corresponding host device, and similarly by other MPIO drivers on respective other host devices, through interaction with multiple storage arrays in an active-active configuration. Such MPIO drivers illustratively form a multi-path layer or MPIO layer comprising multi-pathing software of the host devices. Other types of multi-pathing software and host drivers can be used in other embodiments.

Although MPIO driver 112-1 is utilized to perform certain aspects of the above-described functionality for efficient delivery of offload API commands in some embodiments, this is by way of illustrative example only, and other embodiments need not utilize MPIO drivers in implementing such functionality. For example, Linux native multi-pathing arrangements utilizing device mappers, or other types and arrangements of host device components, can be configured to implement at least portions of the functionality for efficient delivery of offload API commands as disclosed herein.

In addition, although the above-described functionality for efficient delivery of offload API commands is primarily described above in the context of host device 102-1 and its MPIO driver 112-1, it is assumed that similar functionality for efficient delivery of offload API commands is implemented by host device 102-2 and its MPIO driver 112-2.

In some embodiments, this advantageous functionality can be implemented substantially entirely under the control of the MPIO driver 112-1, and in such embodiments the path selection logic 114-1 is illustratively configured to control performance of one or more steps of the example process to be described below in conjunction with FIG. 2. Additional or alternative host device components, such as additional or alternative logic components implemented in the host device 102-1, can be used to control performance of the FIG. 2 process or other algorithms in illustrative embodiments.

Again, it is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform at least portions of the above-described advantageous functionality for efficient delivery of offload API commands.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, additional or alternative logic instances or other components implemented in the host devices 102 and the storage arrays 105 can be used to perform at least portions of the functionality for efficient delivery of offload API commands.

The operation of the information processing system 100 will now be described in further detail with reference to the flow diagram of the illustrative embodiment of FIG. 2. The process as shown includes steps 200 through 208, and is suitable for use in the system 100 but is more generally applicable to other types of systems comprising a host device and first and second storage arrays. The host device illustratively comprises a given one of the first and second host devices 102-1 and 102-2 of FIG. 1, and the first and second storage arrays illustratively comprise respective ones of the storage arrays 105, with each such storage array comprising a plurality of storage devices. The storage devices of each such storage array are assumed to include logical storage devices such as LUNs or other logical storage volumes.

Figure 2:
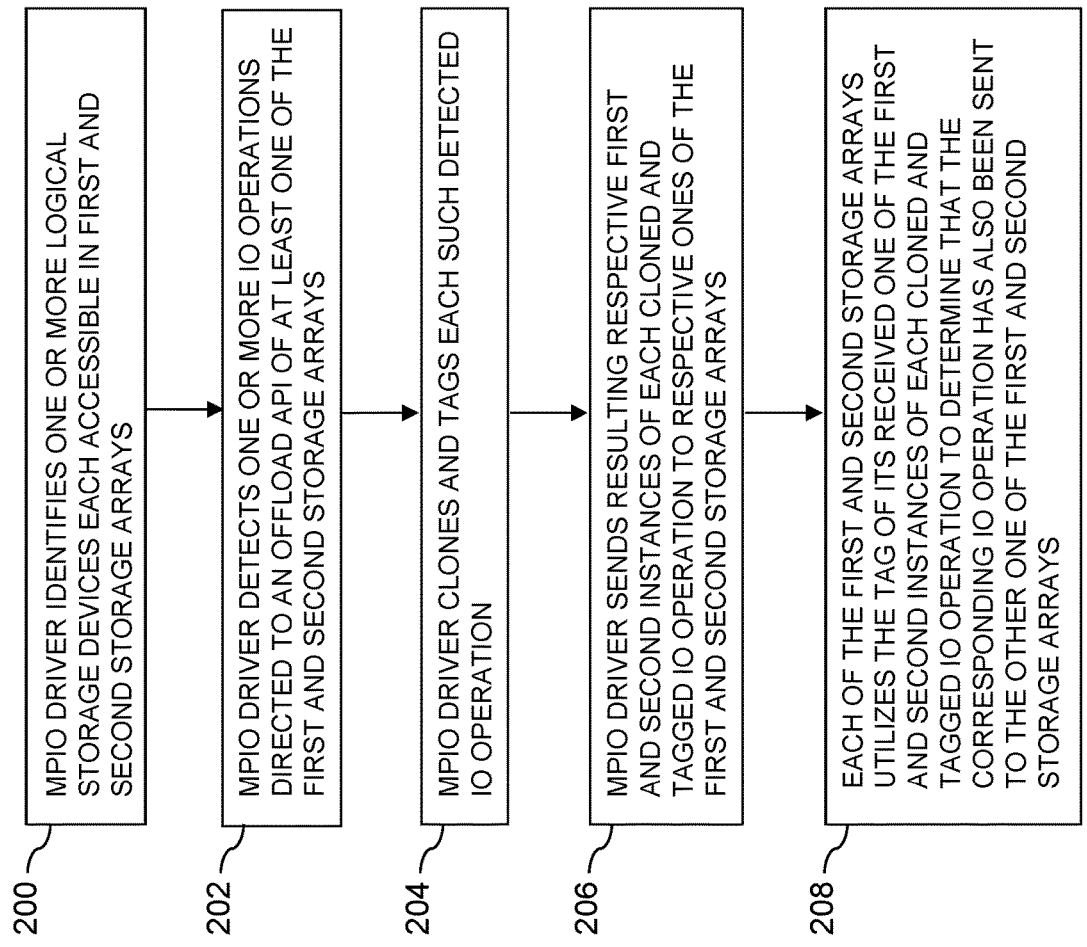
FIG. 2 is a flow diagram illustrating an example process for efficient delivery of offload API commands to multiple storage arrays in an illustrative embodiment.

The steps of the FIG. 2 process are illustratively performed at least in part by or under the control of an MPIO layer comprising one or more MPIO drivers of respective host devices, such as the MPIO drivers 112-1 and 112-2 of the first and second host devices 102-1 and 102-2 of system 100, although other arrangements of system components can control or perform at least portions of one or more of the steps in other embodiments. At least portions of the functionality of the FIG. 2 process may be performed at least in part in conjunction with a load balancing algorithm or other type of path selection algorithm executed by instances of path selection logic 114 of one or more MPIO drivers 112. A given host device is referred to as simply a "host" in some description herein.

In step 200, an MPIO driver of a host device identifies one or more logical storage devices each accessible in first and second storage arrays. The first and second storage arrays are illustratively arranged, for example, in a metro/stretched configuration or other active-active configuration providing access to LUNs or other types of logical storage devices that are replicated across the two storage arrays. One of the storage arrays may be designated as local and the other storage array designated as remote, although such storage-side local-remote designations are not required. Each of the logical storage devices illustratively comprises a LUN or other type of logical storage volume or logical storage device implemented using one or more storage devices of the first and second storage arrays.

In step 202, the MPIO driver detects one or more IO operations directed to an offload API of at least one of the first and second storage arrays. The one or more IO operations illustratively comprise or are otherwise associated with one or more offload API commands, such as those described in more detail elsewhere herein.

In step 204, the MPIO driver clones and tags each such detected IO operation. Various types of cloning can be used for this purpose. For example, an identical copy of the IO operation can be made. Other types of cloning arrangements, not necessarily involving making exact copies of detected IO operations, can be used in other embodiments, and terms such as "clone" and "cloned" as used herein are therefore intended to be broadly construed. The tag can be incorporated into one or more fields of a given detected IO operation, or otherwise associated with the IO operation, such as by prepending at least a portion of the tag to the IO operation, appending at least a portion of the tag to the IO operation, and/or incorporating at least a portion of the tag into the IO operation. A wide variety of different tag formats, including single-bit or multi-bit tags, can be used.

In step 206, the MPIO driver sends resulting respective first and second instances of each cloned and tagged IO operation to respective ones of the first and second storage arrays. For example, path selection logic of the MPIO driver illustratively selects one of a plurality of available paths to the first storage array for delivering the first instance to the first storage array, and selects one of a plurality of available paths to the second storage array for delivering the second instance to the second storage array.

In step 208, each of the first and second storage arrays utilizes the tag of its received one of the first and second instances of each cloned and tagged IO operation to determine that the corresponding IO operation has also been sent to the other one of the first and second storage arrays. Accordingly, the tagging of the first and second instances of each cloned IO operation is illustratively configured to cause each of the respective first and second storage arrays to prevent replication of the cloned IO operation to the other one of the first and second storage arrays, thereby advantageously conserving storage-side resources, including computation resources and inter-array communication resources.

The steps of the FIG. 2 process are shown in sequential order for clarity and simplicity of illustration only, and certain steps can at least partially overlap with other steps. Also, different ones of the steps can be performed at least in part by different host device components, such as additional or alternative components of the host device. Such components are illustratively part of an MPIO layer comprising one or more MPIO drivers, but in other embodiments can be implemented elsewhere in the host device.

As indicated above, different instances of the FIG. 2 process can execute at least in part in parallel with one another for different path selection processes involving different logical storage devices or other components. Also, multiple additional instances of the FIG. 2 process can be performed in respective ones of one or more additional host devices that share the first and second storage arrays.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for efficient delivery of offload API commands. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different offload API command delivery arrangements within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
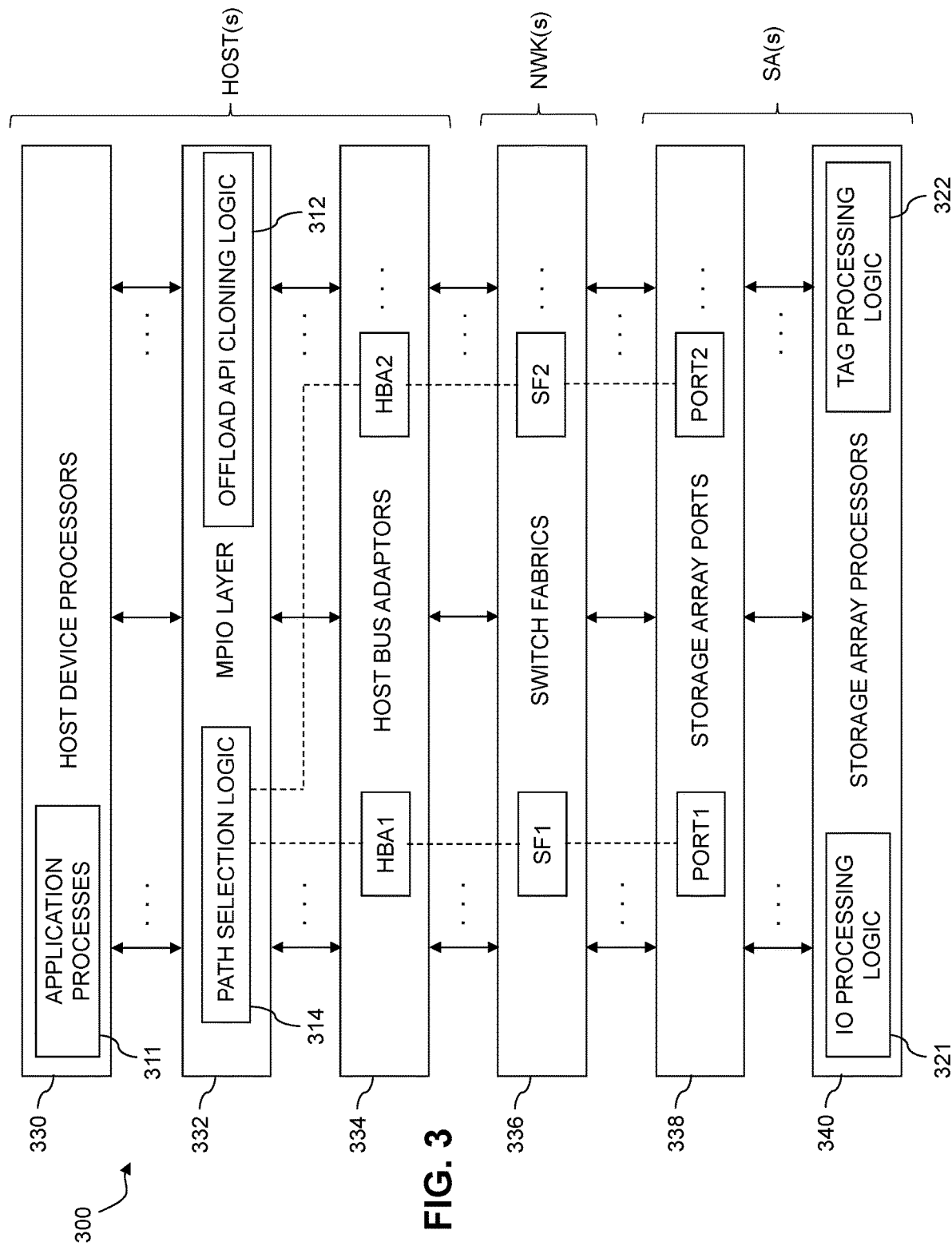
FIG. 3 is a block diagram showing multiple layers of a layered system architecture that includes functionality for efficient delivery of offload API commands to multiple storage arrays in an illustrative embodiment.

Referring now to FIG. 3, another illustrative embodiment is shown. In this embodiment, an information processing system 300 comprises host-side components that include offload API cloning logic 312 and path selection logic 314, and storage-side components that include IO processing logic 321 and tag processing logic 322. Additional or alternative host-side and storage-side components can be used in other embodiments. For example, although the offload API cloning logic 312 is shown as being separate from the path selection logic 314 in this embodiment, in other embodiments the offload API cloning logic 312 can be wholly or partially incorporated into the path selection logic 314, or vice versa. Similarly, although the tag processing logic 322 is shown as being separate from the IO processing logic 321 in this embodiment, in other embodiments the tag processing logic 322 can be wholly or partially incorporated into the IO processing logic 321, or vice versa.

The system 300 in the present embodiment is configured in accordance with a layered system architecture that illustratively includes a host device processor layer 330, an MPIO layer 332, an HBA layer 334, a switch fabric layer 336, a storage array port layer 338 and a storage array processor layer 340. As illustrated in the figure, the host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The system 300 in this embodiment implements functionality for efficient delivery of offload API commands over selected paths to multiple storage arrays. The paths are utilized to access logical storage devices of the storage arrays, with the logical storage devices storing data for one or more application processes 311 running in one or more host device processors of the host device processor layer 330. The functionality for efficient delivery of offload API commands in this embodiment is assumed to be controlled at least in part by the offload API cloning logic 312 and path selection logic 314, although other arrangements are possible. This functionality includes, for example, identifying one or more logical storage devices each accessible in at least first and second storage arrays, detecting one or more IO operations associated with an offload API of at least one of the first and second storage arrays, cloning each such detected IO operation, and sending resulting respective first and second instances of each cloned IO operation to respective ones of the first and second storage arrays. The first and second instances of each cloned IO operation are tagged prior to being sent to respective ones of the first and second storage arrays so as to allow each of the first and second storage arrays to separately determine that the other one of the first and second storage arrays has been sent a corresponding instance of the cloned IO operation, as described in more detail elsewhere herein.

The offload API cloning logic 312 can include multiple distinct offload API cloning logic instances for respective ones of a plurality of host devices of the system 300. Similarly, the path selection logic 314 can include multiple distinct path selection logic instances for respective ones of a plurality of host devices of the system 300.

The IO processing logic 321 implemented in the storage array processor layer 340 performs various types of processing for servicing of read requests, write requests and other types of IO operations received from one or more host devices of the system 300. The tag processing logic 322 is illustratively configured to utilize the above-noted tags to detect offload API commands or other IO operations associated with an offload API that have been cloned by one or more of the host devices and delivered to multiple storage arrays. For example, the tag processing logic 322 is illustratively configured, for each of a plurality of IO operations received by a given storage array from a given host device, whether the IO operation has or has not been cloned and delivered by the given host device to another storage array.

In the case of offload API commands, such processing directs each storage array receiving the IO operation that it need not replicate the IO operation to another storage array, as it normally would do for an IO operation associated with an offload API in the absence of the efficient delivery techniques disclosed herein.

Such an arrangement advantageously conserves storage-side resources, including computation resources and inter-array communication resources, that would otherwise be consumed in replicating the offload API command from one storage array to another storage array. In some embodiments, there may be separate instances of the IO processing logic 321 and the tag processing logic 322 for each of a plurality of storage arrays of the system 300.

The host-side components including path selection logic 314 and offload API cloning logic 312 therefore operate in conjunction with the storage-side components including IO processing logic 321 and tag processing logic 322 to implement at least portions of the functionality for efficient delivery of offload API commands as disclosed herein.

The MPIO layer 332 is an example of what is also referred to herein as a multi-path layer, and comprises one or more MPIO drivers implemented in respective host devices. Each such MPIO driver illustratively comprises an instance of offload API cloning logic 312 and an instance of path selection logic 314 configured to perform path selection for delivery of IO operations to the storage arrays of system 300 as previously described. As indicated above, the path selection logic 314 in some embodiments operates in conjunction with the offload API cloning logic 312, the IO processing logic 321 and the tag processing logic 322 in implementing at least portions of the functionality for efficient delivery of offload API commands as disclosed herein. Additional or alternative layers and logic circuitry arrangements can be used to implement the disclosed efficient delivery of offload API commands in other embodiments.

In the system 300, path selection logic 314 is configured to select different paths for sending IO operations from a given host device to a storage array. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of n paths to a shared storage array, or alternatively different ones of the host devices can have different numbers and types of paths to the storage array.

The path selection logic 314 of the MPIO layer 332 in this embodiment therefore selects paths for delivery of IO operations to the one or more storage arrays having the storage array ports of the storage array port layer 338. This illustratively includes selecting first and second paths for delivery of respective first and second instances of a given cloned and tagged IO operation to respective first and second storage arrays.

In this illustrative embodiment, the host devices and storage arrays of system 300, through their respective instances of components 312, 321 and 322, provide functionality for efficient delivery of offload API commands as disclosed herein, possibly with involvement of other host device or system components, such as the path selection logic 314 of MPIO layer 332.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for efficient delivery of offload API commands can be performed by different MPIO drivers in different host devices, or using other types of host drivers, such as, for example, iSCSI drivers.

The particular arrangements described above are therefore presented by way of illustrative example only. Numerous alternative arrangements of these or other features can be used in implementing efficient delivery of offload API commands in other illustrative embodiments.

It is apparent from the foregoing that the illustrative embodiments disclosed herein can provide a number of significant advantages relative to conventional arrangements.

For example, some embodiments configure one or more host devices to each include functionality for efficient delivery of offload API commands to respective storage arrays or other storage systems.

These and other illustrative embodiments disclosed herein advantageously address and overcome problems of conventional practice that might otherwise arise when processing offload API commands or other IO operations associated with an offload API for delivery to multiple storage systems under the control of a host device.

This is achieved in some embodiments by cloning and tagging corresponding IO operations in the host device for delivery to multiple storage systems, instead of delivering such IO operations from the host device to only a single one of the storage systems that would then be required to replicate the IO operations to the other storage system.

Such arrangements advantageously conserve storage-side resources, such as computation and inter-array communication resources that might otherwise have been consumed in replicating offload API commands or other IO operations associated with an offload API from one storage system to another.

Accordingly, some embodiments disclosed herein can provide significantly improved performance in situations in which, for example, a given host device would otherwise send offload API commands to a single one of multiple storage systems such that the receiving storage system has to consume excessive storage-side resources in replicating the offload API commands to the other storage system.

These and other embodiments can provide significantly improved performance, for example, in metro/stretched configurations, active-active configurations or other configurations of at least first and second storage systems, in which a host device communicates with the first storage system over a first set of paths and communicates with the second storage system over a second set of paths.

The disclosed functionality can be implemented using a wide variety of different host devices and storage systems.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as an Amazon Web Services (AWS) system, a Google Cloud Platform (GCP) system and a Microsoft Azure system. Virtual machines provided in such cloud-based systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a central processing unit (CPU), a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, network 104 and storage arrays 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, path selection logic, offload API cloning logic, IO processing logic, tag processing logic, and additional or alternative components. Also, the particular configurations of system and device elements and associated processing operations illustratively shown in the drawings can be varied in other embodiments. For example, a wide variety of different host device and storage system configurations, and associated techniques, can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to identify one or more logical storage devices each accessible in at least first and second storage systems;
   to detect one or more input-output operations associated with an offload application programming interface of at least one of the first and second storage systems;
   to clone each such detected input-output operation; and
   to send resulting respective first and second instances of each cloned input-output operation to respective ones of the first and second storage systems;

wherein the first and second instances of each cloned input-output operation are tagged prior to being sent to respective ones of the first and second storage systems so as to allow each of the first and second storage systems to separately determine that the other one of the first and second storage systems has been sent a corresponding instance of the cloned input-output operation;

wherein the first and second storage systems are configured to operate in a replication mode in which a given input-output operation received in a given one of the first and second storage systems from a host device would normally be replicated from the given one of the first and second storage systems to the other one of the first and second storage systems; and wherein responsive to detection, by the given one of the first and second storage systems, of the given input-output operation being one of the cloned input-output operations based on its inclusion of a tag inserted by the host device, the tag having a particular tag type indicative of the association of the given input-output operation with the offload application programming interface, the given one of the first and second storage system prevents the normal replication of the given input-output operation from the given one of the first and second storage systems to the other one of the first and second storage systems.

2. The apparatus of claim 1 wherein said at least one processing device comprises at least a portion of the host device.

3. The apparatus of claim 1 wherein the first and second storage systems are arranged in an active-active configuration relative to one another.

4. The apparatus of claim 1 wherein the tagging of the first and second instances of each cloned input-output operation is configured to cause each of the respective first and second storage systems to prevent replication of the cloned input-output operation to the other one of the first and second storage systems.

5. The apparatus of claim 1 wherein the one or more input-output operations are associated with at least one command of the offload application programming interface.

6. The apparatus of claim 1 wherein the one or more input-output operations associated with the offload application programming interface comprise at least one of hardware acceleration application programming interface commands and hardware offload application programming interface commands.

7. The apparatus of claim 1 wherein said at least one processing device further comprises a multi-path layer that includes at least one multi-path input-output driver configured to control delivery of input-output operations from the host device to the first and second storage systems over selected paths through a network over which the host device communicates with the first and second storage systems.

8. The apparatus of claim 7 wherein a given one of the one or more logical storage devices is accessible to the multi-path layer of the host device via one or more first sets of paths to the first storage system and one or more second sets of paths to the second storage system and further wherein the first instance of the cloned input-output operation is sent to the first storage system over a selected path of the one or more first sets of paths and the second instance of the cloned input-output operation is sent to the second storage system over a selected path of the one or more second sets of paths.

9. The apparatus of claim 7 wherein the at least one multi-path input-output driver is configured to perform the identifying of the one or more logical storage devices, the detecting of the one or more input-output operations, the cloning of the detected input-output operations and the sending of the resulting respective first and second instances to respective ones of the first and second storage systems.

10. The apparatus of claim 7 wherein the at least one multi-path input-output driver is configured to verify that each of the first and second storage systems is able to handle offload application programming interface commands.

11. The apparatus of claim 1 wherein the one or more input-output operations associated with the offload application programming interface comprise one or more input-output operations associated with at least one offload application programming interface command wherein the command comprises at least one of an XCOPY command, a WRITE SAME command and an UNMAP command.

12. The apparatus of claim 1 wherein the first and second instances of the cloned input-output operation are executed to completion in the respective first and second storage systems and the cloned input-output operation is considered complete in the host device only after both the first and second storage systems have indicated successful completion of the respective first and second instances of the cloned input-output operation to the host device.

13. The apparatus of claim 1 wherein the at least one processing device is further configured to detect a failure in execution of one of the first and second instances of the cloned input-output operation and responsive to the detected failure to send another instance of the cloned input-output operation to a particular one of the first and second storage systems not associated with the detected failure.

14. The apparatus of claim 13 wherein the other instance of the cloned input-output operation is sent without being tagged so that the particular one of the first and second storage systems that receives the other instance will replicate the cloned input-output operation to the other one of the first and second storage systems.

15. A computer program product comprising a non-transitory processor-readable storage medium having stored therein program code of one or more software programs, wherein the program code, when executed by at least one processing device comprising a processor coupled to a memory, causes said at least one processing device:

to identify one or more logical storage devices each accessible in at least first and second storage systems;

to detect one or more input-output operations associated with an offload application programming interface of at least one of the first and second storage systems;

to clone each such detected input-output operation; and to send resulting respective first and second instances of each cloned input-output operation to respective ones of the first and second storage systems;

wherein the first and second instances of each cloned input-output operation are tagged prior to being sent to respective ones of the first and second storage systems so as to allow each of the first and second storage systems to separately determine that the other one of the first and second storage systems has been sent a corresponding instance of the cloned input-output operation;

wherein the first and second storage systems are configured to operate in a replication mode in which a given input-output operation received in a given one of the first and second storage systems from a host device would normally be replicated from the given one of the first and second storage systems to the other one of the first and second storage systems; and wherein responsive to detection, by the given one of the first and second storage systems, of the given input-output operation being one of the cloned input-output operations based on its inclusion of a tag inserted by the host device, the tag having a particular tag type indicative of the association of the given input-output operation with the offload application programming interface, the given one of the first and second storage system prevents the normal replication of the given input-output operation from the given one of the first and second storage systems to the other one of the first and second storage systems.

16. The computer program product of claim 15 wherein the tagging of the first and second instances of each cloned input-output operation is configured to cause each of the respective first and second storage systems to prevent replication of the cloned input-output operation to the other one of the first and second storage systems.

17. The computer program product of claim 15 wherein the program code when executed further causes said at least one processing device:
to detect a failure in execution of one of the first and second instances of the cloned input-output operation; and
responsive to the detected failure, to send another instance of the cloned input-output operation to a particular one of the first and second storage systems not associated with the detected failure;
wherein the other instance of the cloned input-output operation is sent without being tagged so that the particular one of the first and second storage systems that receives the other instance will replicate the cloned input-output operation to the other one of the first and second storage systems.

18. A method comprising:
identifying one or more logical storage devices each accessible in at least first and second storage systems;
detecting one or more input-output operations associated with an offload application programming interface of at least one of the first and second storage systems;
cloning each such detected input-output operation; and
sending resulting respective first and second instances of each cloned input-output operation to respective ones of the first and second storage systems;
wherein the first and second instances of each cloned input-output operation are tagged prior to being sent to respective ones of the first and second storage systems so as to allow each of the first and second storage systems to separately determine that the other one of the first and second storage systems has been sent a corresponding instance of the cloned input-output operation;
wherein the first and second storage systems are configured to operate in a replication mode in which a given input-output operation received in a given one of the first and second storage systems from a host device would normally be replicated from the given one of the first and second storage systems to the other one of the first and second storage systems;
wherein responsive to detection, by the given one of the first and second storage systems, of the given input-output operation being one of the cloned input-output operations based on its inclusion of a tag inserted by the host device, the tag having a particular tag type indicative of the association of the given input-output operation with the offload application programming interface, the given one of the first and second storage system prevents the normal replication of the given input-output operation from the given one of the first and second storage systems to the other one of the first and second storage systems; and
wherein the method is performed by at least one processing device comprising a processor coupled to a memory.

19. The method of claim 18 wherein the tagging of the first and second instances of each cloned input-output operation is configured to cause each of the respective first and second storage systems to prevent replication of the cloned input-output operation to the other one of the first and second storage systems.

20. The method of claim 18 further comprising:
detecting a failure in execution of one of the first and second instances of the cloned input-output operation; and
responsive to the detected failure, sending another instance of the cloned input-output operation to a particular one of the first and second storage systems not associated with the detected failure;
wherein the other instance of the cloned input-output operation is sent without being tagged so that the particular one of the first and second storage systems that receives the other instance will replicate the cloned input-output operation to the other one of the first and second storage systems.

* * * * *